(12) United States Patent
Yan et al.

(10) Patent No.: US 9,536,628 B2
(45) Date of Patent: Jan. 3, 2017

(54) NUCLEAR FUEL ASSEMBLY SUPPORT GRID

(71) Applicant: Westinghouse Electric Company LLC, Cranberry Township, PA (US)

(72) Inventors: Jin Yan, Niskayuna, NY (US); Peng Yuan, Pittsburgh, PA (US); Zeses E. Karoutas, Lexington, SC (US); Levie D. Smith, III, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 155 days.

(21) Appl. No.: 14/559,029

(22) Filed: Dec. 3, 2014

(65) Prior Publication Data

US 2016/0163402 A1     Jun. 9, 2016

(51) Int. Cl.
*G21C 3/34* (2006.01)
*G21C 3/322* (2006.01)
*G21C 3/352* (2006.01)

(52) U.S. Cl.
CPC ............. *G21C 3/352* (2013.01); *G21C 3/322* (2013.01)

(58) Field of Classification Search
CPC ....... G21C 3/322; G21C 3/352; G21C 3/3563; G21C 3/356; G21C 3/3566; G21C 3/34; G21C 3/3424; G21C 3/334; G21C 3/344; G21C 2003/3432; G21C 3/32; G21C 3/33; G21C 3/332; G21C 3/3416; G21C 3/08; G21C 3/336

See application file for complete search history.

(56) References Cited

U.S. PATENT DOCUMENTS

| 4,089,741 | A | * | 5/1978 | Patterson | G21C 3/322 29/469 |
| 5,299,245 | A | * | 3/1994 | Aldrich | G21C 3/322 376/439 |
| 6,526,116 | B1 | | 2/2003 | Nguyen et al. | |
| 6,606,369 | B1 | | 8/2003 | Smith, III et al. | |
| 7,085,340 | B2 | | 8/2006 | Goldenfield et al. | |
| 8,369,475 | B2 | | 2/2013 | Lu et al. | |

* cited by examiner

*Primary Examiner* — Jack W Keith
*Assistant Examiner* — Fredrick Michael
(74) *Attorney, Agent, or Firm* — Joseph C. Spadacene; Westinghouse Electric Company LLC

(57) ABSTRACT

A nuclear fuel assembly grid having a torpedo-shaped mixing vane assembly supported at each intersection of the grid straps that surrounds a fuel rod support location. The torpedo-shaped stem supports mixing vanes that extend over each of the fuel rod support locations.

9 Claims, 6 Drawing Sheets

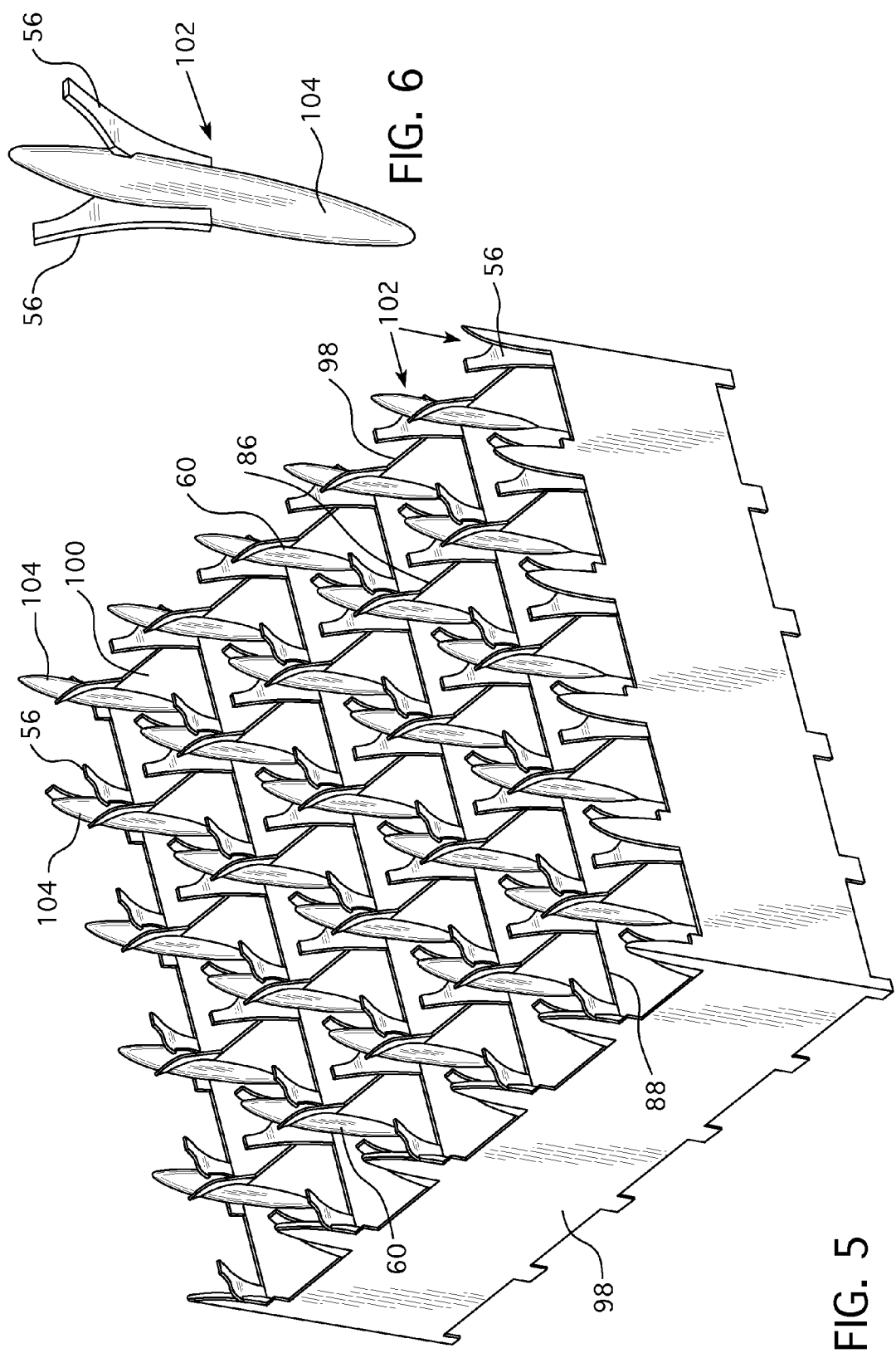

NUCLEAR FUEL ASSEMBLY SUPPORT GRID

BACKGROUND

1. Field

This invention pertains generally to a nuclear reactor fuel assembly and more particularly to such a fuel assembly with spacer grids that enhance heat transfer and reduce pressure drop.

2. Related Art

The primary side of nuclear reactor power generating systems which are cooled with water under pressure comprises a closed circuit which is isolated and in heat exchange relationship with a secondary circuit for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16 completing the primary loop. Typically, a plurality of the above described loops are connected to a single reactor vessel 10 by reactor coolant piping 20.

An exemplary reactor design is shown in more detail in FIG. 2. It should be appreciated that like reference characters are employed to designate corresponding components in the several figures. In addition to the core 14 comprised of a plurality of parallel, vertical, co-extending fuel assemblies 22, for purpose of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the reactor vessel and the core barrel 32, is turned 180 degrees in a lower plenum 34, passes upward through a lower support plate 37 and a lower core plate 36 upon which the fuel assemblies are seated and through and about the assemblies. In some designs, the lower support plate 37 and the lower core plate 36 are replaced by a single structure, a lower core support plate having the same elevation as 37. The coolant flow through the core and surrounding area 38 is typically large on the order 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly and perforations 42 in the upper core plate 40.

Rectilinearly movable control rods 28, which typically include a drive shaft 50 and a spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core plate 36 in the core region of the nuclear reactor. In addition to the bottom nozzle 58, the structural skeleton of the fuel assembly 22 also includes a top nozzle 62 at its upper end and a number of guide tubes or thimbles 84 which align with the guide tubes 54 in the upper internals. The guide tubes or thimbles 84 extend longitudinally between the bottom and top nozzles 58 and 62 and at opposite ends are rigidly attached thereto.

The fuel assembly 22 further includes a plurality of transverse grids 64 axially spaced along and mounted to the guide thimbles 84 and an organized array of elongated fuel rods 66 transversely spaced and supported by the grid 64. A plan view of a grid 64 without the guide thimbles 84 and fuel rods 66 is shown in FIG. 4. The guide thimbles 84 pass through the cells labeled 96 and the fuel rods occupy the remaining cells 94. As can be seen from FIG. 4, the grids 64 are conventionally formed from an array of orthogonal straps 86 and 88 that are interleaved in an egg-crate pattern with the adjacent interface of four straps forming approximately square support cells through which the fuel rods 66 are supported in the cells 94 in transverse, spaced relationship with each other. In many designs, springs 90 and dimples 92 are stamped into opposite walls of the straps that form the support cells 94. The springs and dimples extend radially into the support cells and capture the fuel rods 66 therebetween; exerting pressure on the fuel rod cladding to hold the rods in position. The orthogonal array of straps 86 and 88 is welded at each strap end to a bordering strap 98 to complete the grid structure 64. Also, the fuel assembly 22, as shown in FIG. 3, has an instrumentation tube 68 located in the center thereof that extends between and is captured by the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a stack of a plurality of nuclear fuel pellet s 70 and is closed at its opposite ends by upper and lower end plugs 72 and 74. The pellets 70 are maintained in a stack by a plenum spring 76 disposed between the upper end plugs 72 and the top of the pellet stack. The pellets 70, composed of fissile material, are responsible for creating the reactive power of the reactor. The cladding which surrounds the pellets functions as a barrier to prevent the fission byproducts from entering the coolant and further contaminating the reactor system.

To control the fission process, a number of control rods 78 are reciprocally movable in the guide thimbles 84 located at predetermined positions in the fuel assembly 22. The guide thimble locations can be specifically seen in FIG. 4 represented by reference character 96, except for the center location which is occupied by the instrumentation tube 68. Specifically, a rod cluster control mechanism 80, positioned above the top nozzle 62, supports a plurality of control rods 78. The control mechanism has an internally threaded cylindrical hub member 82 with a plurality of radially extending flukes or arms 52 that form the spider previously noted with regard to FIG. 2. Each arm 52 is interconnected to a control rod 78 such that the control rod mechanism 80 is operable to move the control rods vertically in the guide thimbles 84 to thereby control the fission process in the fuel assembly 22; under the motive power of a control rod drive shaft 50 which is coupled to the control rod hub 80, all in a well-known manner.

As mentioned above, the fuel assemblies are subject to hydraulic forces that exceed the weight of the fuel rods and thereby exert significant forces on the fuel rods and the assemblies. In addition, there is significant turbulence in the coolant in the core caused by mixing vanes 56 upon the upper surfaces of the straps of many grids which promote the transfer of heat from the fuel rod cladding to the coolant. Mixing of the coolant is very important because the power output of the core is limited by the hottest fuel rod to a temperature that will avoid compromising the fuel rod cladding. The more uniform the temperature across the core, the higher the power output of the reactor that can safely be achieved. Mixing of the coolant not only draws more heat off the fuel element cladding, but also distributes that heat across the fuel assembly. The turbulence also causes a pressure drop which has to be balanced across the core to maintain the uniformity of flow of the coolant. To the extent that the pressure drop can be reduced, it enables the fuel assembly designers to add other features that will enhance the contribution of the fuel assembly.

Accordingly, it is an object of this invention to provide an improved fuel assembly design that promotes enhanced mixing, enhanced heat transfer from the fuel rods to the coolant, enhanced critical heat flux performance and has a reduced pressure drop.

SUMMARY

These and other objects are achieved by a new fuel assembly design having a parallel, spaced array of a plurality of elongated nuclear fuel rods supported between a lower nozzle and an upper nozzle and having an axial length along the elongated dimension of the nuclear fuel rods. A plurality of spaced support grids are arranged in tandem along the axial length of the fuel rods, between the upper nozzle and the lower nozzle, at least partially enclosing an axial portion of the circumference of each fuel rod within a corresponding support cell of the support grids to maintain a lateral spacing between fuel rods. At least one of the support grids comprises a plurality of elongated, intersecting straps that define the support cells at the intersection of each four adjacent straps that surround the nuclear fuel rods. A length of each strap along its elongated dimension, between the intersections of the four adjacent straps forms a wall of the corresponding support cell. An intersection of each wall that surrounds a part of the circumference of the fuel rods, with an adjoining wall that surrounds a part of the circumference of the fuel rods, supports a mixing vane that extends over the corresponding support cell. In one embodiment, the mixing vanes that extend on opposite sides of the walls that support the fuel rods are tilted in an opposite direction to form a counter-rotating effect on reactor coolant. In another embodiment, the mixing vanes that extend on opposite sides of the walls that support the fuel rods are tilted in the same direction to reinforce a flow pattern on reactor coolant.

Preferably, the mixing vanes are supported at the intersection from a stem that has a rounded cross section with the stem extending along the intersection into the support cells with the radius of curvature of the rounded cross section of the stem decreasing as the stem extends into the support cell. Desirably, the stem extends and is tapered above an attachment of the vanes to the stem and the stem is rounded at its upper-most and lower-most extensions. In such an arrangement, the stem and vane assembly generally resemble a torpedo. In still another embodiment, the stem has an elongated body and a lower end of at least some of the stems have diametrically extending slits that fit over the walls extending from the intersection. Preferably, the stems are welded to the walls at their slits.

BRIEF DESCRIPTION OF THE DRAWINGS

A further understanding of the invention can be gained from the following description of the preferred embodiments when read in conjunction with the accompanying drawings in which:

FIG. 5 is a perspective view of a support grid constructed in accordance with one embodiment of this invention;

FIG. 6 is a perspective view of the mixing vane and stem assembly shown in FIG. 5;

DESCRIPTION OF THE PREFERRED EMBODIMENT

Figure 1:
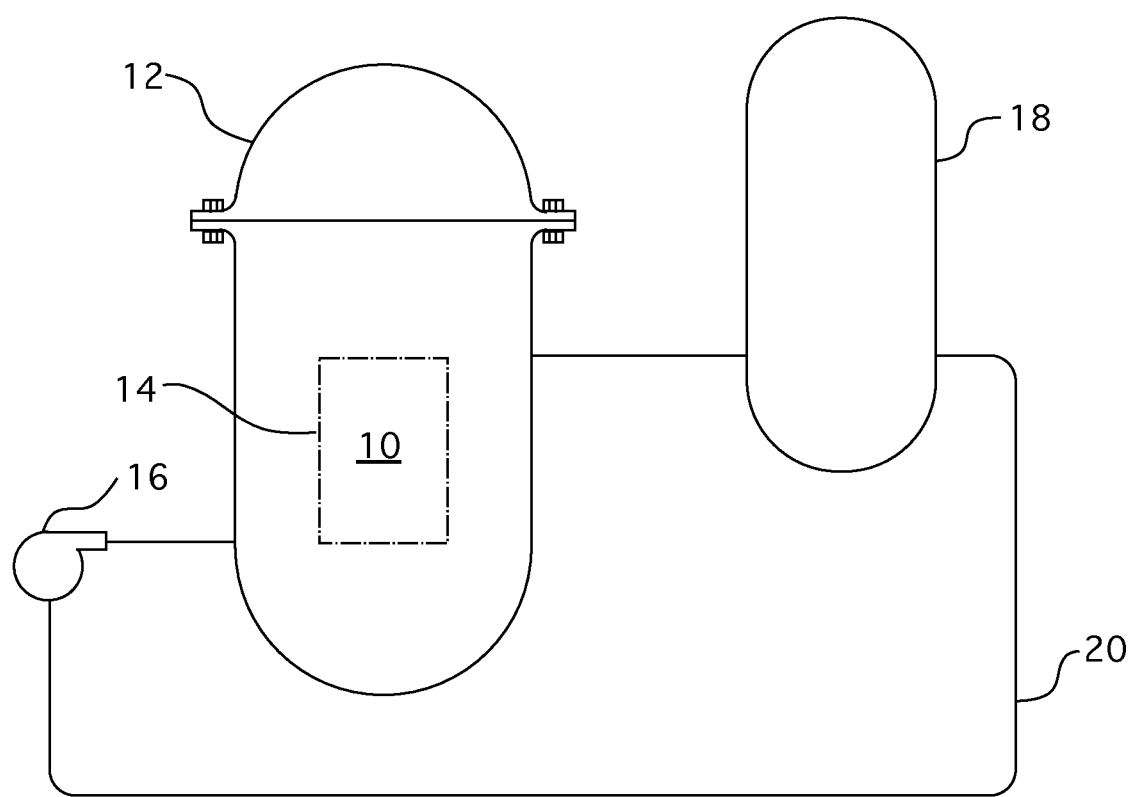
FIG. 1 is a simplified schematic of a nuclear reactor system to which this invention can be applied.
Figure 2:
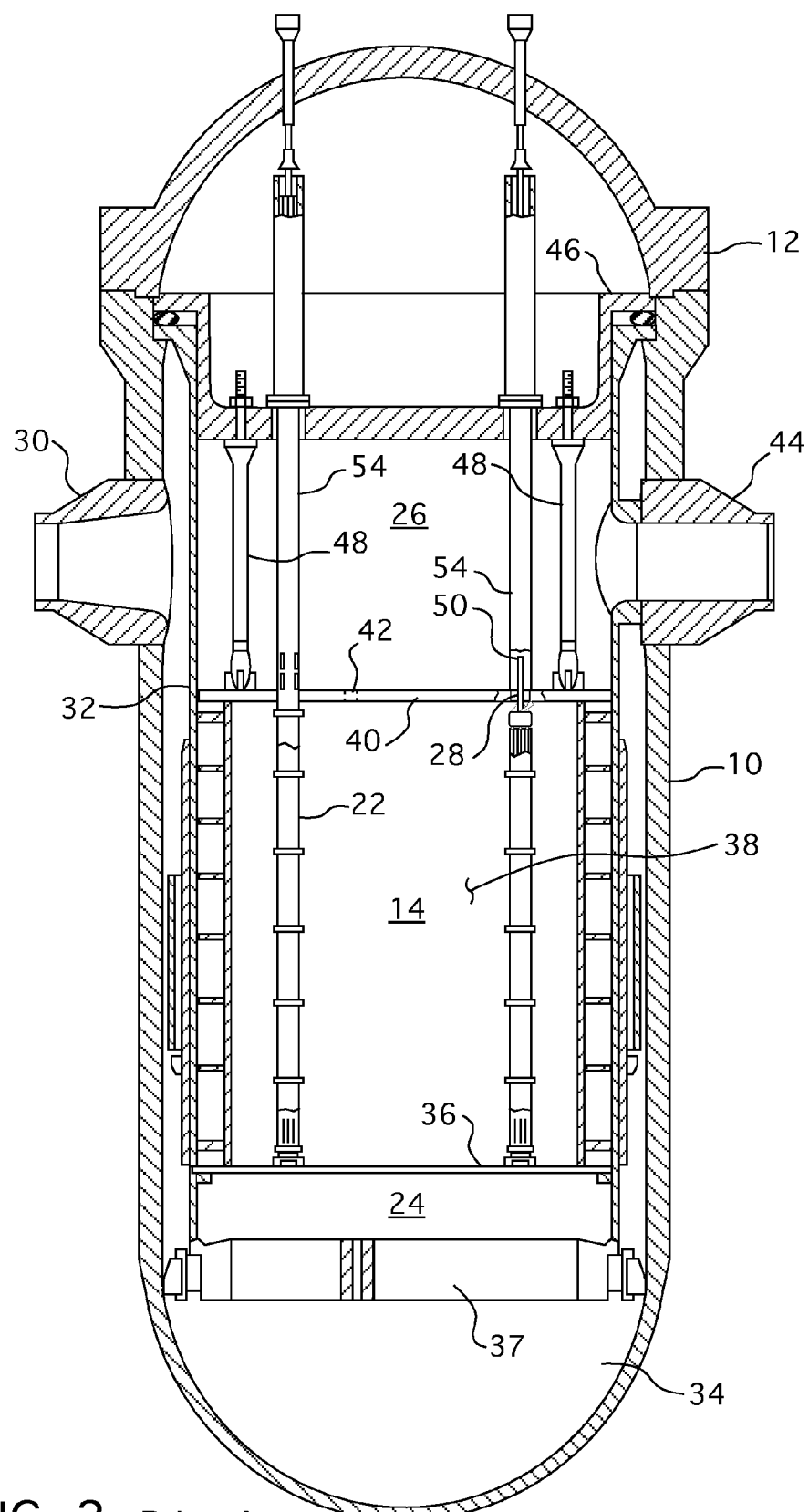
FIG. 2 is an elevational view, partially in section, of a nuclear reactor vessel and internal components to which this invention can be applied.
Figure 3:
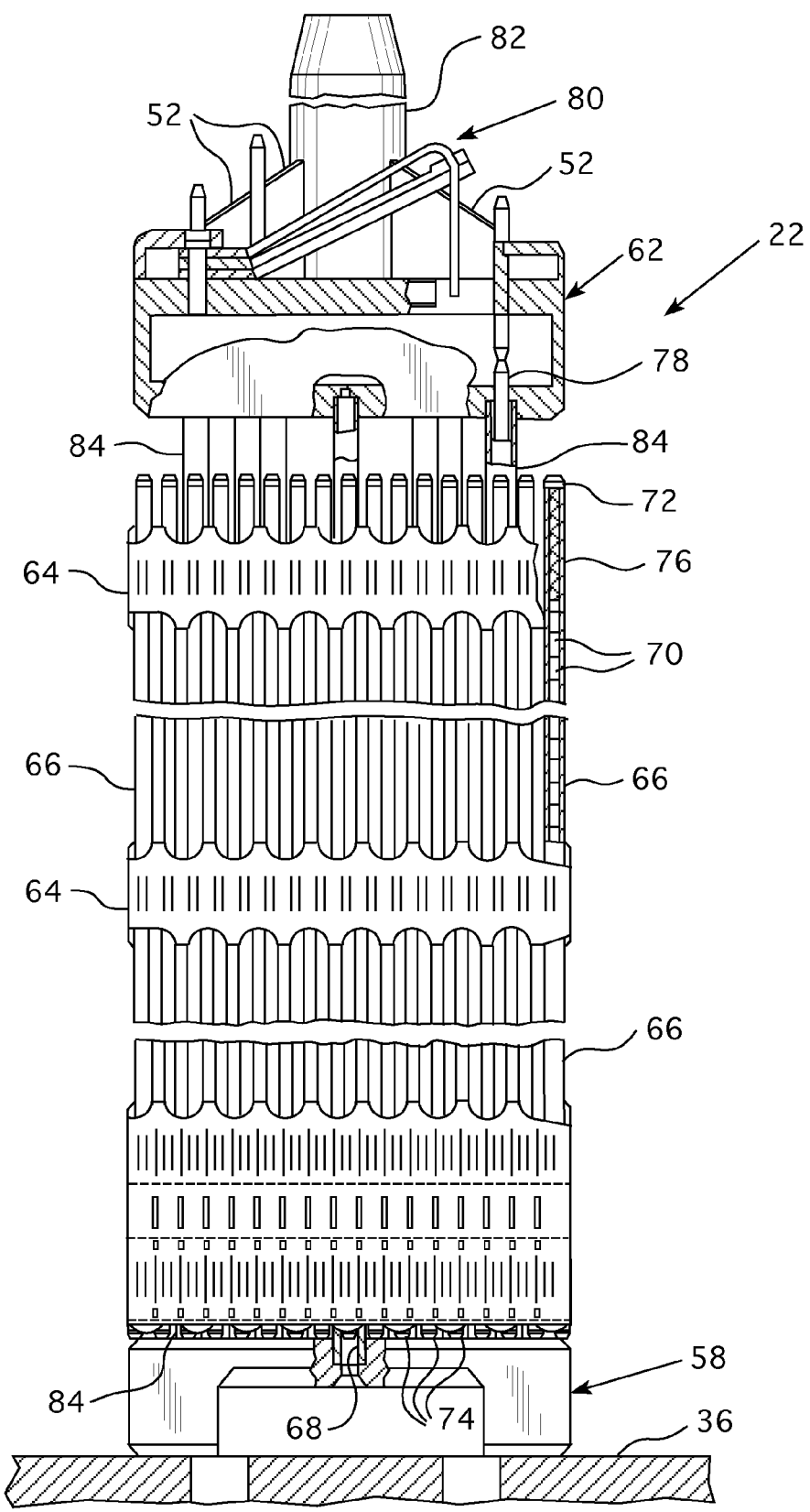
FIG. 3 is an elevational view, partially in section, of a fuel assembly illustrated in vertically shortened form, with parts broken away for clarity.

The invention provides a new fuel assembly design for a nuclear reactor and more particularly an improved spacer grid design for a nuclear fuel assembly. The improved grid is generally formed from a matrix of approximately square (or hexagonal) cells, some of which 94 support fuel rods 66 while others of which 96 are connected to guide thimbles and a central instrumentation tube. The perspective view shown in FIG. 5 looks very much like the prior art grid shown in FIG. 4 since the improvement is mainly focused on the mixing vanes 56. As shown in FIGS. 5-8, the grid of this embodiment is also formed from two orthogonally positioned sets of parallel, spaced straps 86 and 88 that are interleaved in a conventional manner and surrounded by an outer strap 98 to form the structural make-up of the grid 64. Though orthogonal straps 86 and 88, forming substantially square fuel rod support cells, are shown in this embodiment, it should be appreciated that this invention can be applied equally as well to other grid configurations, e.g., hexagonal and circular grids. The orthogonal straps 86 and 88 and in the case of the outer rows, the outer strap 98 define the support cells 94 at the intersection of each four adjacent straps that surround the nuclear fuel rods 66. A length of each strap along the straps' elongated dimension, between the intersections of four adjacent straps, forms a wall 100 of the fuel support cells 94.

Figure 4:
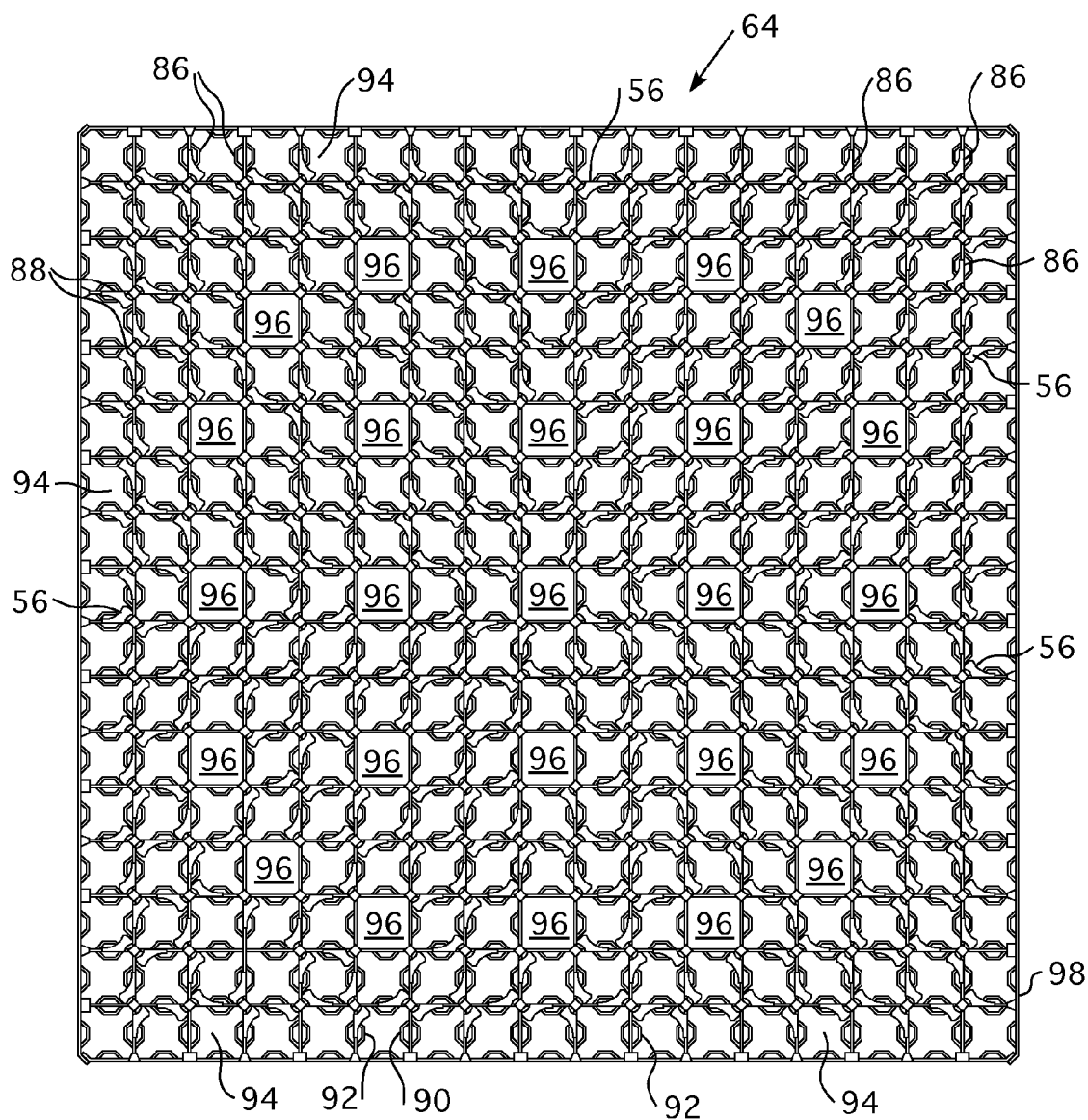
FIG. 4 is a plan view of an egg-crate support grid of the prior art.
Figure 7:
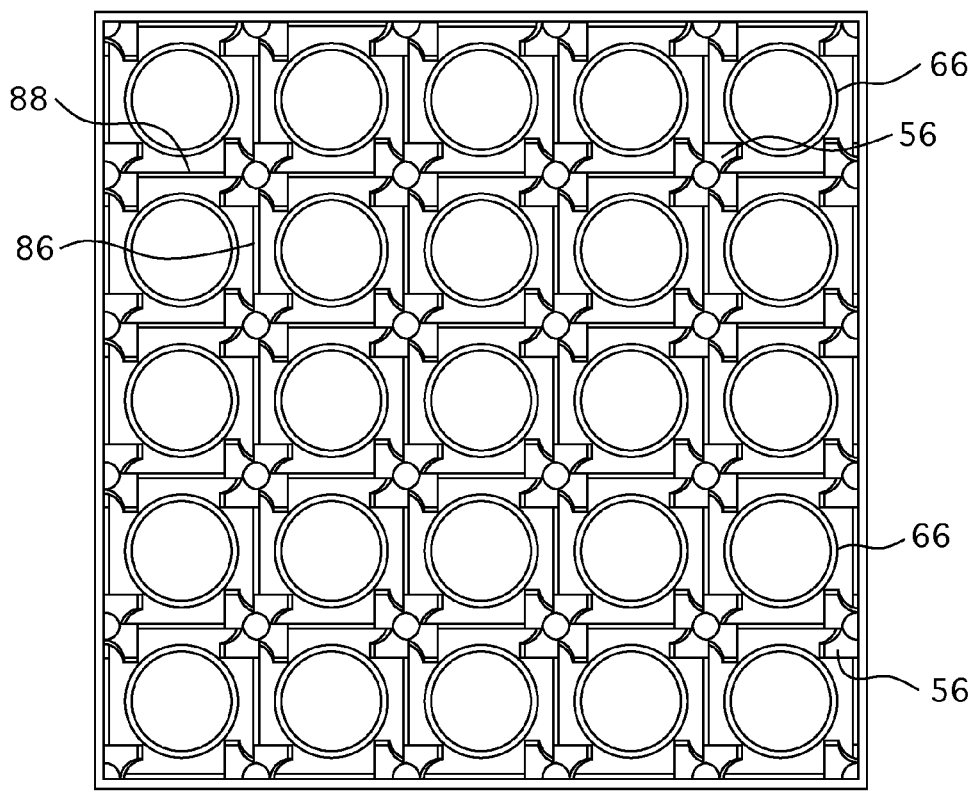
FIG. 7 is a plan view of a five-by-five matrix of the support cells shown in FIG. 5, with the springs and dimples omitted for simplicity, that shows the mixing vanes tilted in the same direction in accordance with one embodiment of this invention.
Figure 8:
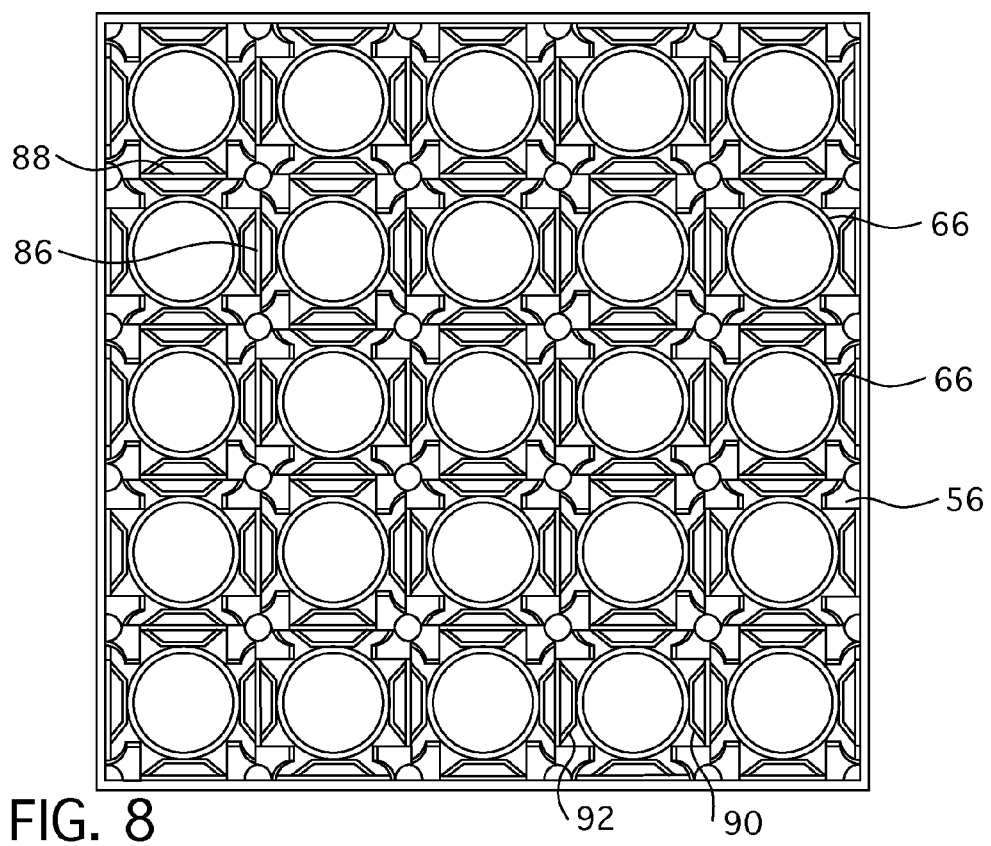
FIG. 8 is another example of the five-by-five matrix shown in FIG. 7 with the springs and dimples in place to support the fuel rods and adjoining vanes around the circumference of each stem and vane assembly titled in a counter-rotating direction.

As previously mentioned, the critical heat flux performance of the fuel assembly is the key factor to determine the operating range of a pressurized water reactor. The critical heat flux performance of a fuel assembly can be enhanced and the pressure drop across the fuel assembly reduced by employing the mixing vane assembly illustrated in FIGS. 5 and 6. FIG. 5 shows a perspective view of a five-by-five array of fuel support cells that has a novel vane assembly 102 supported at each of the intersections 60 of the straps 86 and 88 of the cells 94 that support fuel rods. The vane assembly 102 combines the streamlined, elongated body stem 104 with separate mixing vanes that respectively extend over the adjoining fuel support cells 94. Though not shown in FIGS. 5-8, no vanes 56 are provided over the cells through which the guide thimbles extend as shown in FIG. 4. Accordingly, the intersections with the outer straps 98 and those adjoining the guide thimble cell 96 will only have zero, one or two vanes 56 extending from the stem 104 over the adjoining fuel rod support cells 94 while all the other fuel rod support cells 94 will have four vanes supported at substantially equally spaced circumferential positions respectively extending outwardly from the stem 104 over each of the adjoining fuel rod support cell 94 as shown in FIGS. 5, 7 and 8. The streamlined body stem 104 and mixing vanes 56 shown in this embodiment provides enhanced heat convection by mixing the cold coolant in the middle of the sub-channel with the hot coolant near the fuel rod surface. The streamlined body pushes the cooler coolant from the center of the channel to the surface of the fuel rod and minimizes irrecoverable pressure losses. The two or four mixing vanes create a swirl that displaces the hot coolant near the rods' surface with the cooler coolant from the channel center. A two-phase computational fluid dynamics model has predicted that the critical heat flux performance of this grid spacer is improved relative to the conventional split vane spacer grid design illustrated in FIG. 4. In addition, the computational fluid dynamics model has predicted that the single phase pressure drop produced by this invention is significantly reduced relative to the conventional split vane spacer grid design illustrated in FIG. 4. The streamlined torpedo body 104 has two diametrically extending slots in its lower end that are circumferentially offset by ninety degrees to fit over the grid straps 86 and 88 at the intersection 60 to which it is welded. The streamlined stem 104 enhances the grid crush strength. The mixing vanes are connected to the strap and the streamlined torpedo body 104, such as by welding. Extra support from the torpedo body 104 will enhance the structural integrity of the grid cell. Grids manufactured in accordance with this invention are still constructed in the conventional way with the addition of the vane assembly 102 which is slotted onto the intersection 60 at each corner of a fuel element support cell 94 and welded. The addition in manufacturing costs is estimated to be low in impact.

FIG. 7 is a plan view illustrating one embodiment of this invention (with the springs and dimples removed to more easily focus on the vane structure) with the vanes all tilted in the same direction. FIG. 8 illustrates a second embodiment where adjoining vanes are tilted in opposite directions to establish a counter-rotating effect.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel assembly for a nuclear reactor comprising:
a parallel, spaced array of a plurality of elongated nuclear fuel rods supported between a lower nozzle and an upper nozzle and having an axial length along the elongated dimension of the nuclear fuel rods; and
a plurality of spaced support grids arranged in tandem along the axial length of the fuel rods, between the upper nozzle and the lower nozzle, at least partially enclosing an axial portion of a circumference of each fuel rod within a corresponding support cell of the support grids to maintain a lateral spacing between fuel rods, at least one of the support grids comprising;
a plurality of elongated, intersecting straps that define the support cells at an intersection of each four adjacent straps that surround the nuclear fuel rods, a length of each strap along its elongated dimension, between the intersections of the four adjacent straps forming a wall of the corresponding support cell, wherein an intersection of each wall that surrounds a part of the circumference of the fuel rods, with an adjoining wall that surrounds a part of the circumference of the fuel rods, supports a mixing vane that extends over the corresponding support cell; and
wherein the mixing vanes are directly attached to and supported at the intersection from a stem that has a rounded cross section facing the support cell with the stem extending over the intersection and into the support cells with a radius of curvature of the rounded cross section of the stem decreasing as the stem extends into the support cell.

2. The fuel assembly of claim 1 wherein the mixing vanes that extend on opposite sides of the walls that support the fuel rods are tilted in an opposite direction to form a counter rotating effect on reactor coolant.

3. The fuel assembly of claim 1 wherein the mixing vanes that extend on opposite sides of the walls that support the fuel rods are tilted in the same direction to reinforce a flow pattern on reactor coolant.

4. The fuel assembly of claim 1 wherein the stem extends and is tapered above an attachment of the vanes to the stem and the stem is rounded at its upper most and lower most extensions.

5. The fuel assembly of claim 4 wherein the stem has a streamlined torpedo body.

6. The fuel assembly of claim 1 wherein the stem has an elongated body and a lower end of at least some of the stems have diametrically extending slits that fit over the walls extending from the intersection.

7. The fuel assembly of claim 6 wherein the stem is welded to the walls.

8. The fuel assembly of claim 7 wherein the stem is welded at the slits.

9. The fuel assembly of claim 8 wherein the mixing vanes have either a flat or curved shape such that the pressure drop, heat transfer and critical heat flux performance is optimized.

* * * * *